April 11, 1939. J. T. BALDWIN 2,153,910
COATING COMPOSITION AND PROCESS OF PREPARING THE SAME
Filed Nov. 24, 1930
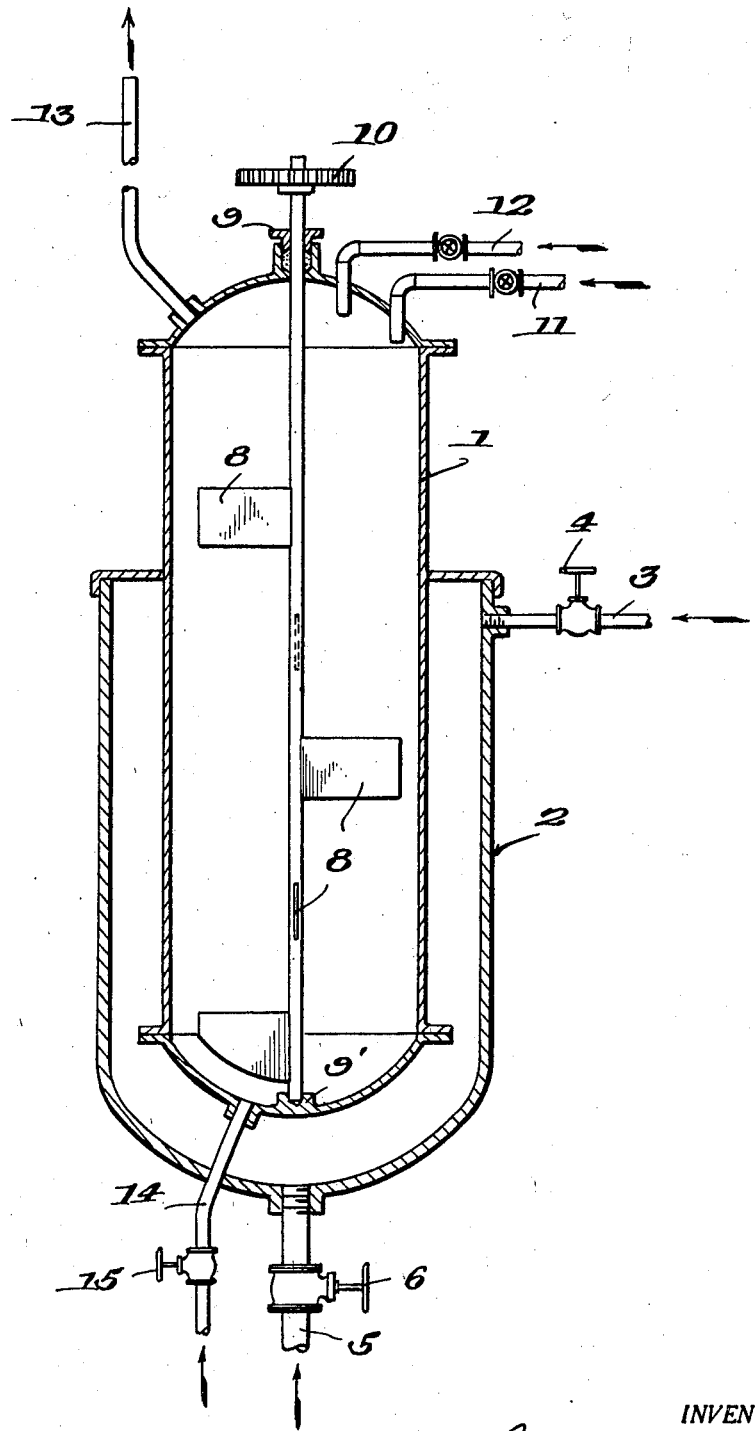
INVENTOR.
Julian T. Baldwin
BY
Stone, Boyden, Mack & Hahn
ATTORNEYS.

Patented Apr. 11, 1939

2,153,910

UNITED STATES PATENT OFFICE 2,153,910

COATING COMPOSITION AND PROCESS OF PREPARING THE SAME

Julian T. Baldwin, West Chester, Pa., assignor to Paulsboro Manufacturing Company, a corporation of New Jersey Application November 24, 1930, Serial No. 497,949

15 Claims. (Cl. 260—18)

This invention relates to materials for plastic coating compositions, and to new products and the procedure for making them. It pertains particularly to dispersions of an alkali-resistant linoleum cement suitable for use in the manufacture of improved floor coverings, using as raw materials oxidized oil gels, suitable volatile dispersing agents, and alkali-resistant resins or resin-tung oil reaction products.

This application is a continuation in part of my co-pending application of even date Serial No. 497,947 now Patent No. 1,971,633, dated Aug. 28, 1934.

When linseed oil or other drying oils dry they form a solid elastic mass which is called a gel. This gel is considered insoluble. Parts of it may be extracted with powerful solvents, the amount capable of being extracted depending on the degree of hardening or oxidation of the oil, highly oxidized oil gels having less extractible matter than those only partially oxidized.

Oxidized "scrim oil" used in linoleum manufacture has only a portion of its matter extractible with powerful solvents, and one of the control tests applied thereon consists in extracting the "scrim oil" in a refluxing apparatus for three days with toluol and with petroleum ether. For example, a good "scrim oil" containing 40% matter extractible with toluol and 20% extractible with petroleum ether, has 60% and 80% of its matter insoluble after this drastic treatment. This latter portion is referred to as the insoluble part and has apparently not been dissolved.

The oxidized oil, however, if it could be made to completely dissolve, could be made into a solution or dispersion suitable as a vehicle for paints, and such paints would dry by evaporation, largely, since the oil would be already oxidized. The paint could then be first dried under scientifically controlled conditions, then applied to the surface to be painted.

It has been discovered that the dissolving or dispersing of the so-called insoluble oil gels can be accomplished by subjecting the gel to pressure in the presence of a dispersing agent or medium such as ethyl alcohol-toluol, ethyl acetate, benzol, ether, acetone, and petroleum, as described in more detail in my co-pending application, Serial No. 497,947. The pressure may be mechanical or vapor pressure. The pressure, if mechanical, may be applied by passing a mixture of the gel and dispersing agent through a pair, or a plurality of pairs, of grinding rolls as they are known in the linoleum industry. A number of passes through the rolls are requisite for securing the thorough dispersion of the gel. The finest dispersions of the gel are obtained by the use of vapor pressure, although the gel may be subjected first to mechanical pressure, then to vapor pressure, then again to mechanical pressure, so that the gel is subjected to mechanical pressure both before and after the vapor pressure treatment.

When vapor pressure is used the procedure is as follows: 700 grams of scrim oil that is ground, and 1500 grams of ethyl alcohol-toluol mixture (equal parts of each solvent) are placed in an aluminium, tantalum, or acid resisting alloy lined autoclave which is then closed. Heat is applied so that the temperature of the autoclave is maintained from 205° F. to 220° F. or at such a temperature that a pressure of 15 lbs. per square inch is created within the autoclave. This is maintained for 70 hours. At the end of this time the average scrim oil will be dispersed in the solvent.

This dispersing process is set forth more in detail in my copending application Serial No. 497,947 of even date herewith.

Other gels besides those which are secured primarily by oxidation may be dispersed by this treatment. Thus oils, including non-drying oils, gelled by sulfur or sulfur chloride may be dispersed by this treatment. China-wood oil gelled by ferric chloride or by heat treatment may be dispersed.

The present invention is concerned likewise with the dispersion of oil gels, particularly those of the oxidized oil variety, in the manner described hereinbefore and in my copending application Serial No. 497,947 of even date herewith, and with the further feature consisting in adding an alkali-resistant resin to the dispersion, so that the oil gel and resin are placed in mutual dispersion in the dispersing agents, and in making a linoleum cement therefrom.

The present day linoleum cement must contain a resin and rosin is used almost exclusively, since rosin is the only resin with the fluxing properties which are necessary in order to dissolve or melt the oxidized oil so that a homogeneous linoleum cement is formed. Rosin may be considered a high boiling point solvent. Rosin, however, is very readily attacked by alkalies. In the process hereinafter described, the oil gel is dispersed in volatile dispersing agents in place of being dissolved in rosin, so that in this way the oil and alkali-resistant resins can be made into a homogeneous plastic without having the rosin present. Due to the introduction of many new powerful soaps and cleaners on the market, alkali resistance is becoming of increasing importance in floor coverings.

The improved process employed herein may be divided into two steps, dispersion and evaporation.

In the practice of the first step of the improved process as carried out in accordance with the present invention, an oil gel, preferably of the oxidized variety, is dispersed with suitable volatile dispersing agents under pressure, in the hereinbefore described manner, and then a phenol-formaldehyde, cumaron, vinyl chloride, or other alkali-resistant resin is added to the dispersion, in order to be placed thereby in mutual dispersion with the oil gel and dispersing agent.

The procedure in connection with the second step of the improved process presents an option between two methods which may be employed. The dispersion may either be heated to such a temperature that the volatile dispersing agent will be distilled off, or it may be sprayed onto linoleum composition in its liquid form, so that the dispersing agent will be volatilized in the further steps of the process of linoleum manufacture, particularly in the passage of the linoleum composition between steam-heated rolls. If the first optional procedure is employed, the resultant product will be linoleum cement in a form ready for use in the usual process of linoleum manufacture, while if the second procedure is employed, the linoleum cement will be formed in the subsequent steps of the linoleum process and used as fast as formed.

Resin-tung oil reaction products may also be used in place of resin alone, provided such reaction products fulfill the requirement of being resistant to the action of alkalies.

In a specific embodiment of the process as carried out in accordance with the present invention, from two to four parts of phenol-formaldehyde or other alkali-resistant resin are added to ten parts of oxidized oil gel in the form of a dispersion created by subjecting a mixture of oxidized oil gel and volatile dispersing agent in a pressure reaction vessel to a vapor pressure of four atmospheres. After complete mutual dispersion the dispersing agent is removed by either the first or second optional procedure.

Another specific example of a highly alkali-resistant linoleum binding agent is: Scrim oil made of China-wood oil is dispersed with solvents under pressure in an acid-resistant autoclave. The addition of an active phenol-formaldehyde resin is made to the China-wood oil gel before it is dispersed (the resin and oil are put together in the autoclave). The solvents are evaporated from the dispersion and the oil-resin mixture is heat treated at 350° F. to 400° F. until a body suitable for linoleum cement is obtained. Ten parts of oil to two of resin may be taken.

It is possible to heat treat from 150° F. to 600° F.

It is important during the heat treatment to prevent the oil gel residues from being darkened by contact with the oxygen in the air, while they are at elevated temperatures. Carbon dioxide may be employed advantageously for this purpose.

The type of apparatus used in this heat treatment may best be understood by having reference to the accompanying drawing, in which: 1 represents an aluminum reaction vessel of a suitable size, which is generally about 54 inches high and 15 inches inside diameter, partially surrounded by a superheated steam or hot oil jacket 2, equipped with steam or hot oil supply pipe 3 having control valve 4 and steam or hot oil discharge pipe 5 having control valve 6. The reaction vessel is equipped with an agitator consisting of shaft 7 and blades 8, the shaft passing through a stuffing box 9 at the upper end of the reaction vessel and being driven through the agency of drive wheel 10 by a belt or other suitable connector from a source of power, not shown. The reaction vessel is equipped with valved pipes 11 and 12 for the introduction of carbon dioxide and solvents, respectively, with a vertical aluminum pipe 13, about 12 feet long and ¾ inch inside diameter with its upper end open, comprising a reflux condenser, and with a residuum draw off pipe 14 provided with valve 15. Shaft 7 is supported at the bottom of vessel 1 by thrust bearing 9'.

A specific example of a treatment as carried out in the above apparatus is as follows. One hundred pounds of the residue left after evaporating or otherwise removing the solvents from an oil gel dispersion is placed in reaction vessel 1 and heating fluid admitted to jacket 2. This is in contrast to heating the vessel by direct fire, which would cause the walls of the vessel to become so undesirably hot that the oil residue would tend to be cracked or decomposed by the hot spots. The top of the vessel is enclosed and the reflux condenser 13 is air cooled. A slow stream of carbon dioxide gas is admitted through pipe 11 and the contents of the vessel are then heated to 420° F. in one-half hour. If the gel residue is derived from scrim oil, the residue will be transformed to insoluble, infusible form in less than one-half hour at that temperature. To secure the soluble, but infusible form, the temperature is held at 420° F. for from three to fifteen minutes, then five gallons of butanol are added slowly through pipe 12. The agitator is kept in motion from the start of the treatment. The solution produced may be reduced further with solvents according to the body desired. After cooling it is ready for use.

In this case, if the linoleum cement is to be used as is usual (not in solution) it is generally desirable to change the oil gel and resin mixture to the insoluble, infusible form with the heat treatment. This consists of applying heat to the residue left after the evaporation or removal of the dispersing agents or solvents. The heat reaction becomes very rapid at 460° F. and the gel is transformed to an infusible, insoluble solid when oxidized linseed or China-wood oils are used. The reaction is carried out at a lower temperature as 300° F. to avoid discoloration and decomposition. It is desired in most cases to stop the reaction before the insoluble, infusible state is reached. This may be done by cutting with solvent at the proper time. This treatment very greatly increases the resistance of the oil to alkalies or aqueous liquids. The length of time and the temperature required to form the insoluble infusible form depend on the nature of the original oil. With highly oxidized linseed and China-wood oils the time required to make this form is from five to fifteen minutes at 420° F. At lower temperatures the time increases. Reactive agents as phenol or reactive anti-oxidants up to 5% by weight of the oil may be incorporated with the oil before this hardening process. The addition of resins during or before the cooking reduces the viscosity of the gel solutions in most cases. Glycerine may be added to esterify the free acids. Since this heat treatment eventually makes an insoluble, infusible form, it suggests the use of these dispersed oil gels as moulding plastics.

Throughout the specification and claims, the expression "pure oil gels" is to be understood as meaning oil gels formed by initial drying processes from pure drying oils, and containing no other ingredients than the oxidized or modified oil itself, thereby excluding any such gels as those formed from linoleum scrap or like materials containing water soluble materials, coloring matter or other impurities harmful in paints or varnishes.

Also, in the specification and claims the term "dispersion" is to be taken as including all liquid mixtures of carrier and secondary material wherein the two are so thoroughly intermingled as to make discrete particles of the secondary material invisible to the naked eye, thereby including true solutions as well as dispersions. The term "dispersing agent" is to be taken to mean a liquid carrier in the nature of either a solvent or a medium for holding colloid particles.

The active resin referred to above is one which is convertible into a resin of higher melting point. It possesses the inherent property of hardening by such conversion. The oil employed is also hardenable in that, as noted above, it is rendered solid and infusible by heat. This is particularly true of the highly oxidized oils or oil gels.

What I claim is:

1. The process of producing a coating composition comprising treating oxidized oil gel containing in substantial amount with respect to said gel, oxidized fatty oil that is normally insoluble in such materials as toluol and petroleum ether, with an organic liquid, low boiling volatile dispersing agent under pressure and thereby producing a dispersion, adding to the dispersion a quantity of alkali-resistant resin to produce a mutual dispersion of oil gel and resin, and evaporating the dispersing agent therefrom.

2. The process of producing a coating composition comprising treating oxidized oil gel containing in substantial amount with respect to said gel, oxidized fatty oil that is normally insoluble in such materials as toluol and petroleum ether, with an organic liquid, low boiling volatile dispersing agent applied under an artificially imposed vapor pressure of the dispersing agent, thereby producing a dispersion, adding to the dispersion a quantity of alkali-resistant resin to produce a mutual dispersion of oil gel and resin, and evaporating the dispersing agent therefrom.

3. The process of producing a coating composition comprising treating oxidized oil gel containing in substantial amount with respect to said gel, oxidized fatty oil that is normally insoluble in such materials as toluol and petroleum ether, with an organic liquid, low boiling volatile dispersing agent applied by heating the gel and dispersing agent together in an enclosed space until dispersion of the gel has taken place, adding to the dispersion a quantity of alkali-resistant resin to produce a mutual dispersion of oil gel and resin, and evaporating the dispersing agent therefrom.

4. The process of producing a coating composition comprising treating oxidized oil gel containing in substantial amount with respect to said gel, oxidized fatty oil that is normally insoluble in such materials as toluol and petroleum ether, with an organic liquid, low boiling volatile dispersing agent under pressure and thereby producing a dispersion, adding to the dispersion a quantity of an alkali-resistant reaction product of a resin and tung oil to produce a mutual dispersion of the oil gel and reaction product, and evaporating the dispersing agent therefrom.

5. The process of producing an alkali-resistant linoleum cement comprising treating oxidized oil gel containing in substantial amount with respect to said gel, oxidized fatty oil that is normally insoluble in such materials as toluol and petroleum ether, with an organic liquid, low boiling volatile dispersing agent under pressure and thereby producing a dispersion, adding to dispersion a quantity of an alkali-resistant reaction product of a resin and tung oil to produce a mutual dispersion of the oil gel and reaction product, and spraying the mutual dispersion on to linoleum mixture and causing evaporation therefrom of the dispersing agent.

6. The process of producing an alkali-resistant linoleum cement comprising treating oxidized oil gel containing in substantial amount with respect to said gel, oxidized fatty oil that is normally insoluble in such materials as toluol and petroleum ether, with an organic liquid, low boiling volatile dispersing agent applied under an artificially imposed vapor pressure of the dispersing agent thereby producing a dispersion, adding to dispersion a quantity of an alkali-resistant reaction product of a resin and tung oil to produce a mutual dispersion of the oil gel and reaction product, and spraying the mutual dispersion onto linoleum mixture and causing evaporation therefrom of the dispersing agent.

7. A process of producing a coating composition containing an insoluble, infusible oil gel, which process comprises treating an oxidized fatty oil gel with an organic liquid volatile dispersing agent under pressure and thereby producing a dispersion, the said oil gel containing in substantial amount with respect to said gel, oxidized fatty oil that is normally insoluble in such materials as toluol and petroleum ether, adding to the dispersion a quantity of alkali-resistant resin to produce a mutual dispersion of oil gel and resin, evaporating the dispersing agent therefrom, and subjecting the resultant residue to heat treatment, and stopping the heat treatment before the insoluble, infusible state has been reached.

8. A process of producing a coating composition containing an insoluble, infusible oil gel, which process comprises treating an oxidized fatty oil gel with an organic liquid volatile dispersing agent under artificially imposed vapor pressure of the dispersing agent, the said oil gel containing in substantial amount with respect to said gel, oxidized fatty oil that is normally insoluble in such materials as toluol and petroleum ether, and thereby producing a dispersion, adding to the dispersion a quantity of alkali-resistant resin to produce a mutual dispersion of oil gel and resin, evaporating the dispersing agent therefrom, and subjecting the resultant residue to heat treatment in an atmosphere of carbon dioxide, and stopping the heat treatment before the insoluble, infusible state has been reached.

9. A process of producing a coating composition containing an insoluble, infusible oil gel which process comprises treating an oxidized fatty oil gel with an organic liquid volatile dispersing agent applied by heating the gel and dispersing agent together in an enclosed space until a vapor pressure of about four atmospheres has developed, the said oil gel containing in substantial amount with respect to said gel, oxidized fatty oil that is normally insoluble in such materials as toluol and petroleum ether, thereby producing a dispersion of the gel, adding to the dispersion a quantity of alkali-resistant resin so as to produce a mutual dispersion of oil gel and resin, evaporating the dispersing agent therefrom, and subjecting the resultant residue to uniformly distributed heat treatment for about one-half hour while raising the temperature of the material to 420° F., and stopping the heat treatment before the insoluble, infusible state has been reached.

10. A process of producing a composition containing a soluble, but infusible oil gel, which process comprises treating an oxidized fatty oil gel with an organic liquid volatile dispersing agent under pressure and thereby producing a dispersion, the said oil gel containing in substantial amount with respect to said gel, oxidized fatty oil that is normally insoluble in such materials as toluol and petroleum ether, adding to the dispersion a quantity of an alkali-resistant reaction product of a resin and tung-oil to produce a mutual dispersion of the oil gel and reaction product, evaporating the dispersing agent therefrom, and subjecting the resultant residue to uniformly distributed heat treatment for about one-half hour in an atmosphere of carbon dioxide while raising the temperature of the material to 420° F. for a few minutes, then slowly incorporating butanol therewith.

11. A composition of matter comprising a solid dispersion of an alkali-resistant resin and oxidized oil gel containing in substantial amount with respect to said gel, oxidized fatty oil that is normally insoluble in such materials as toluol and petroleum ether, which solid dispersion is capable of being rendered insoluble and infusible by heat.

12. A composition of matter comprising a solid dispersion of phenol-formaldehyde resin and oxidized oil gel containing in substantial amount with respect to said gel, oxidized fatty oil that is normally insoluble in such materials as toluol and petroleum ether, which solid dispersion is capable of being rendered insoluble and infusible by heat.

13. A composition of matter comprising a solid dispersion of an alkali-resistant resin-tung oil reaction product and oxidized oil gel containing in substantial amount with respect to said gel, oxidized fatty oil that is normally insoluble in such materials as toluol and petroleum ether, which solid dispersion is capable of being rendered insoluble and infusible by heat.

14. A process of preparing a composition of matter which process comprises mixing an alkali-resistant resin with an oxidized fatty oil gel having the property of hardening with application of heat and containing in substantial amount with respect to the said gel, oxidized fatty oil that is normally insoluble in such materials as toluol and petroleum ether, the mixing being conducted in the presence of an organic liquid, low-boiling volatile dispersing agent under pressure, and thereafter removing the said dispersing agent.

15. A process of preparing a composition of matter which comprises mixing a resin with oxidized oil gel containing in substantial amount with respect to said gel, oxidized fatty oil that is normally relatively insoluble in such materials as toluol and petroleum ether, the mixing being conducted in the presence of an organic liquid, low-boiling volatile dispersing agent under pressure, and thereafter removing the said dispersing agent.

JULIAN T. BALDWIN.